United States Patent [19]

Crowell

[11] 4,004,960

[45] Jan. 25, 1977

[54] COPOLYESTER-AMIDE RESIN AND ADHESIVE PROCESSES

[75] Inventor: Ernest M. Crowell, Beverly, Mass.

[73] Assignee: USM Corporation, Boston, Mass.

[22] Filed: Apr. 7, 1975

[21] Appl. No.: 565,598

[52] U.S. Cl. .............................. 156/331; 156/332; 260/75 N; 260/78 R; 260/75 T; 260/857 PE; 428/423; 428/480; 428/424

[51] Int. Cl.$^2$ .......................................... C09J 3/02

[58] Field of Search ........... 156/331, 332; 428/423, 428/424, 480; 260/857 PE, 75 N, 220, 78 R, 75 T; 36/19.5; 12/142 F

[56] References Cited

UNITED STATES PATENTS

| | | | |
|---|---|---|---|
| 2,281,415 | 4/1942 | Coffman | 260/75 N |
| 3,247,536 | 4/1966 | Rossitto et al. | 36/19.5 |
| 3,436,301 | 4/1969 | McHall | 156/332 |
| 3,468,975 | 9/1969 | Buxbury et al. | 260/857 PE |
| 3,475,385 | 10/1969 | Goodman et al. | 260/75 N |
| 3,849,514 | 11/1974 | Gray et al. | 260/857 PE |
| 3,852,246 | 12/1974 | Schmidt et al. | 260/75 N |

*Primary Examiner*—Charles E. Van Horn
*Assistant Examiner*—J. J. Gallagher
*Attorney, Agent, or Firm*—Benjamin C. Pollard; Richard B. Megley; Vincent A. White

[57] ABSTRACT

Thermoplastic esteramide heterophase copolymer resin including saturated copolyester soft segments chemically joined to copolyamide hard segments, in proportions and copolymerized to an extent to give a melt viscosity, extended tack after melt application and room temperature hardness for use as a hot melt adhesive in the manufacture of shoes.

9 Claims, No Drawings

COPOLYESTER-AMIDE RESIN AND ADHESIVE PROCESSES

FIELD OF USE BACKGROUND AND PRIOR ART RELATIVE TO THE INVENTION

This invention relates to esteramide copolymer resins for use as hot melt adhesives particularly for shoe manufacture and to adhesive processes based on the special properties of the adhesives.

In the attaching of outsoles to shoe uppers, presently preferred adhesives are of the solution type based on polyurethane or polychloroprene. These cements are applied on the attaching surfaces of both the outsole and the shoe upper, are dried to remove the solvent, and are then activated by heat before assembly. The polyurethane adhesive is particularly useful because it will adhere well to leather, polyvinylchloride, and polyurethane shoe upper materials. However, in use of each of these adhesives the matter of driving off of the solvent as well as disposing of solvent vapors inherent in drying the adhesives are objectionable.

It has also been proposed to attach outsoles to shoe uppers using hot melt adhesives applied in molten form to the shoe sole and pressed against the shoe upper while the adhesives are still molten. The process is critical in terms of careful timing to insure assembly before the adhesive hardens. Also the resins used for the adhesives i.e. copolyester resins, do not adhere well to urethane shoe upper material. Efforts to use polyester urethane resins as hot melt adhesives were not successful since the urethane linkage tended to decompose, producing carbon dioxide gas that disrupts pumping and feeding in machine application.

OBJECT OF THE INVENTION

It is an object of the invention to provide an adhesive having an ability to adhere to a wide variety of shoe upper materials comparable to solution type urethane adhesives but which is applicable to the attaching surfaces in molten form and which will also have an extended time period within which the adhesive retains its "tack."

BRIEF STATEMENT OF THE INVENTION

The hot melt adhesive of the present invention is an esteramide heterophase copolymer having amphipathic properties for bonding a wide range of materials, the copolymer being derived from (A) an aromatic-aliphatic copolyester, (B) an amide salt of a dibasic acid and an aliphatic diamine and (C) an aliphatic diamine, the proportions being controlled to provide a resin molecule including a ratio of polyester soft segment to polyamide hard hydrogen-bonding segment effective to prolong a state of aggressive tackiness on rapid cooling.

The esteramide heterophase copolymer resin adhesives of the present invention are prepared by esteramide interchange, aminolysis and polymerization of a copolyester, an amide salt of a diamine and a dicarboxylic acid and a diamine in special proportions giving amphipathic properties for bonding to a wide variety of materials and having heat stability and molecular structure giving good hot melt application properties, aggressive building tack for extended periods when supercooled from molten condition.

The desired hot melt adhesive properties of the resin are believed to be due to the presence in the copolymer of polyester soft segments and polyamide hard segments analogous to segments present in polyesterurethanes. These segments are considered to exist in microscopic domains within the bulk mass of copolymer resin to provide a heterophase system in which the copolymer will have physical properties reflecting the properties which the respective segments would manifest independently. By control of the relative size, proportions, crystallinity and crystal melting points of the segments, the tack, open time and bond strength of the adhesive can be controlled. Also, it has been found that control of the size of the segments is important since if the segments are too large, the bulk product will have too coarse a structure and may have graininess and low strength due to failure within the soft segment domains.

The soft segments of the resin may be one or a mixture of —OH terminated linear polyester products of condensation and polymerization of mixed saturated aliphatic and aromatic dibasic acids with an excess of glycol, or of condensing and polymerizing polylactone polyols having molecular weights of from about 500 to about 1500, preferably from about 500 to about 750 with aromatic dibasic acids and an excess of glycol. The condensation and polymerization provide a copolyester having a molecular weight of from about 5,000 to about 15,000, as determined by melt viscosity methods and having a glass transition temperature, Tg, well below the fabrication and use temperature expected to be encountered in the adhesive joint. These copolyesters alone i.e. before reaction with amide-forming agents, when rapidly cooled from molten state remain as supercooled liquids for substantial periods which may be from three to four hours. Preferred values for Tg for the polyester are from about $-40°$ C. to about $0°$ C., to insure freedom from low temperature brittleness in use of an assembly bonded with the adhesive and to provide molecular mobility in the adhesive for surface wetting at joint assembly temperatures.

Suitable saturated aliphatic dibasic acids will have from 6 to 36 carbon atoms and include adipic acid, azelaic acid and higher acids such as the so called "dimer acids" from dimerization of unsaturated aliphatic monocarboxylic acids, e.g. linoleic acid. Aromatic dibasic acids include terephthalic acid, isophthalic acid and naphthalic acids including the 2,6-, 2,8-, 1,5, and 1,4-isomers. With these acids there will be used at least one glycol having from 2 to 6 carbon atoms. Preferred aromatic acids are mixed terephthalic and isophthalic acids which are preferably employed in relative proportions of from about 3.5 to 6.5 to about 6 to 4 preferably of from about 3 to 4. The aliphatic acids and aromatic acids are preferably empolyed in the proportions of from about 30% to about 60% by weight of the aliphatic acids with from about 70% to about 40% by weight of the aromatic acids.

Glycols for combination with the dibasic acids to form the polyester component may have from 2 to 6 carbon atoms. 1,4-butanediol has been the preferred glycol since its presence in the polymer chain gives good ability of the chain to orient during shear to give strain hardening properties. Also the butanediol polyesters with terephthalic and isophthalic acids have an at least limited potential for crystallization to give improved strength in aged adhesive assemblies. Crystallizing tendencies may be suppressed, where desired through use of odd carbon numbers glycols such as 1,3 propane diol or 1,5 pentane diol. Mixtures of unsubstituted linear glycols including the above as well as ethylene glycol and 1,6 hexanediol or higher members may also be used.

The hard segments of the resin are provided by a polyamide derived from an amide salt of at least one dibasic acid and at least one aliphatic diamine. The polyamide segment of the esteramide copolymer is preferably formed in situ by addition of the amide salt to the molten polyester after the polyester has been condensed to an intermediate melt viscosity level. Polymerization occurs between amide salt molecules and also by an interaction of acid groups of the salt with hydroxyl groups of the polyester.

The amide salts are formed by reaction of at least one saturated aliphatic dibasic acid having a carbon chain of from 2 to 12 carbon atoms or at least one aromatic dibasic acid or mixture of these and at least one aliphatic diamine having a carbon chain of from 2 to 12 carbon atoms. In linear copolyamides containing only moderately long methylene sequence ($-CH_2-$) or, where n is 4 to 8, delay in gel or structure formation on rapid cooling to room temperature is of the order of a few seconds with tackiness disappearing in the same length of time. A preferred amide salt is hexamethylene diammonium adipate. An amide salt from azelaic acid, hexamethylene diammonium azelate when combined with a copolyester and a diamine gave a high melt viscosity copolyesteramide but had properties similar to that using the adipic acid salt.

It has been found that if the amide salt is used alone with the polyester, a grossly two phase mixture of polyester and copolyamide results. However, use in combination with the amide salt of a controlled amount of an aliphatic diamine having a carbon chain of from 2 to 12 carbon atoms results in effective copolymerization to form an esteramide copolymer which shows a controlled development of a heterophase structure on cooling as indicated by development of haziness in the mass of resin on cooling. It appears that the diamine acts on the polyester by aminolysis and substitution of an amine group for a hydroxyl group in the polyester. The second amino group of the diamine is then available for reaction with an acid group of the amine salt to effect a linear integration of the amine salt and the polymers of the salt with the existing polyester chain. The desired development of heterophase structure calls for an amount of diamine such that the amide structure derived from the diamine in the final polyesteramide formed through aminolysis of the polyester constitutes from about 40 to about 70% by weight of the total amide structure in the final polyesteramide. The amide component of the heterophase copolymer may also be formed by separate sequential additions of dibasic acid and diamine to the molten precondensed polyester, to be followed by further heating under vacuum. In this case it is important that the mole proportion of diamine added be equal to and preferably greater than moles of dibasic acid added just prior to the diamine addition.

It is also important that the total amide structure derived from both the amide salt and from the diamine or from the sequential additions of dibasic acid and diamine to the molten polyester constitute from about 5 to about 40%, preferably from about 7.5 to about 30% by weight based on the total weight of the esteramide copolymer.

It is preferred that the polymerization be conducted so as to develop polyamide hard segments having either $T_g$, or $T_m$ if crystalline, which is above the highest temperature to which the adhesive joint will be subjected in use. For shoe products, this temperature is usually considered to by 170° F. although for marginal utility a temperature of 130° F. might be accepted.

It has been found that overall hardness and high temperature stability is improved when the absolute proportion of hard segment structure is increased with respect to soft segments.

The copolymer resin adhesive of the present invention may be applied to surfaces to be bonded by any of the procedures usual to the application of hot melt adhesives. These procedures may be either manual or may involve the use of mechanized applicators such as nozzles, transfer rolls or other devices for distributing the adhesive in a deposit of the desired thickness and arrangement on the surface to be bonded.

The adhesive is heated to bring it to molten condition with a viscosity suitable for application by the procedure selected and is deposited in molten condition on the attaching surface area. It has been found that adhesive enters into wetting adhesive engagement with a wide variety of materials including polyurethanes, vinyl chloride polymers and copolymers, and leathers. It also adheres well to polyurethane and polychloroprene-based solvent primer coatings, for example, on resin-rubber outsoling for shoes.

An important advantage of the adhesive is that the molten adhesive deposit rapidly gels and develops tack and retains it for an extended period even after cooling. By tack is meant the ability to form a strong union when lightly pressed against a similar adhesive surface with minimum or no zone or reduced strength where the adhesive surfaces are brought together. This tack retention may persist for as long as several minutes and is of value in reducing the criticality of the time factor after application of adhesive within which articles must be assembled.

The physical action which occurs is believed to be the development of hard domains in the adhesive when the temperature falls below the crystallization, $T_g$ temperature or Hydrogen bond forming temperature of the polyamide segments of the copolymer although the soft domains constituted by the polyester remain mobile so that a gel or viscoelastic state develops. In this state, the mobility of the soft domains maintain tack while the hard domains provide strength by means of long range structure so that when a bond is established by the adhesive, the strength of the adhesive due to the hard domains resists rupture.

The following examples are given to aid in understanding the invention, but it is to be understood that the invention is not limited to the particular materials, proportions, temperatures or other details of the examples.

EXAMPLE 1

An —OH terminated low molecular weight copolyester was made by esterifying a blend of 45% by weight azelaic acid, 31% by weight isophthalic acid and 24% by weight of terephthalic acid with an excess of 1,4 butanediol. The processing time was about 5 hours at 180° to 230° C. under atmospheric pressure and in the presence of 0.15% by weight of dibutyl tin dilaurate based on the weight of the acids.

Four gram moles (1,068 grams) of the esterification product were condensed under vacuum at 250° C. to an estimated molecular weight of 5,000 to 10,000. 0.4 gram moles of 1,6 hexamethylene diammonium adipate salt (106.8 grams) were added and stirred into the molten material and dissolved to form a clear solution. 0.2 gram moles of melted 1,6 hexamethylene diamine (25grams) were added to the batch and stirring was continued for 25 minutes at 150° C. with reflux of vapors from the bath. At the end of this 25 minutes vacuum was reapplied and the temperature raised to 250° C. The melt viscosity of the batch increased to a level of approximately 1,000 to 1,500 poises. The product was poured out and solidified in aluminum trays. The polymer gelled rapidly on cooling to room temperature and the gelled product would, for a period of several minutes, adhere to itself on light contact. The product became increasingly opaque when cooled in bulk and when tested after aging 18 hours in the bulk, the polymer had instantaneous Shore A hardness of 83.

Test strips 1 inch wide were cut from shoe upper materials and shoe sole materials including plasticized polyvinyl chloride coated cloth, suede leather and fabric backed polyurethane upper materials and also resin-rubber shoe soling material primed with a commercial polychloroprene primer. In the following tests, the surfaces of only shoe upper materials were prewarmed to about 50° C. by radiant heat before application of the molten polymer material.

A portion of the polymer material was melted at a temperature of 205° C. and spread as a film about 0.010 inch thick on the brushed roughed surface of the polyvinyl chloride coated strips and on the primed resin-rubber shoes sole strips. It was found that the two cemented surfaces could be adhesively joined after standing in the open laboratory for 10 seconds after cooling using a pressure of 286 p.s.i. for 15 seconds. The joint had an immediate peel strength of 15 pounds at a peel rate of 10 inches per minute. After standing for one day, the peel strength increased to 46 pounds.

Test strips assembled after the coated pieces had remained in the open laboratory for 25 seconds after coating give a peel strength of 27 pounds directly after assembly and this peel strength increased to 46 pounds after standing for one day.

A bond made after the test pieces had remained in the open laboratory for 60 seconds after coating developed a peel strength of 38 pounds directly following assembly and this peel strength increased to 56 pounds after standing for 1 day.

In a further test, molten polymer was applied to the surface of a pre-roughed polyvinyl chloride coated fabric and joined under pressure to a polychloroprene primed resin-rubber soling material of which the surface had been heated to 49° C., the assembly being made about 15 seconds after application of the molten material to the polyvinyl chloride material. When tested 30 seconds after completing the joint, the bond had 10 pounds peel strength. After aging for 1 day, the peel strength of the assembly was 45 pounds. The preceding experiment was repeated except that a commercial polyurethane primer coating on a resin-rubber sole base was used rather than the polychloroprene primer. As in the preceding test, assembly of the polyvinyl chloride-fabric materials with the polyurethane primer coated resin-rubber material, (warmed to 66° C.), was accomplished 15 seconds after the molten polymeric material had been applied to the polyvinyl chloride-fabric material. Assembly pressure was maintained for 15 seconds. When tested 30 seconds after pressure, the peel strength was 25.8 pounds. After aging for 18 hours, the peel strength was 42.8 pounds.

Molten polymeric material was applied at a temperature of 205° C. to a suede leather test strip and to polychloroprene primed resin-rubber shoe soling material. 15 seconds after application of the molten material, the coated surfaces were joined under pressure. Peel strength after aging for 18 hours was 30 pounds.

A test strip of napped fabric backed glossy polyurethane was coated with the molten polymer. After standing for about 16 seconds, the coated surface was pressed against a similar coated surface of polychloroprene primed resin-rubber outsole material. A peel strength test after 18 hours resulted in tearing of the polyurethane and separation of the polyurethane from the fabric backing. The force developed was 14 pounds. In a similar test of a backed polyurethane shoe upper material of different manufacture, failure occurred in the same way after application of 18.5 pounds.

EXAMPLE 2

A copolyester was prepared as in Example 1, and 1,064 grams (4 moles) of the copolyester were condensed under vacuum at 250° C. to a molecular weight of about 10,000. This copolyester is soluble in Toluene. A water cooled reflux condenser was fitted to the reactor after releasing the vacuum and there were then added 0.2 moles (53.4 grams) of 1,6 hexamethylene diammonium adipate. A clear solution was formed and there was then added 0.2 moles (25 grams) of 1,6 hexamethylene diamine. The mixture was stirred for 20 minutes while the temperature dropped from 177° to 155° C. At this time the reflux condenser was removed and vacuum applied. The temperature was raised to 250° C. and maintained at that value until the viscosity of the polymeric material had reached about 1,000 poises. The polymer was then poured into aluminum trays to solidify. A film formed from the molten material and rapidly cooled became a rubbery, tacky gel which became opaque when rapidly elongated in tension. The bulk polymer in the trays became opaque on aging at room temperature. The polymer swells but does not dissolve in toluene but does dissolve in a 50—50 blend of toluene and ethyl alcohol. This indicates that the product is a single heterophase polymer and not a mechanical blend of two separate unlike polymers.

Test strips 1 inch wide were cut from shoe upper materials and shoe sole materials including plasticized polyvinyl chloride coated cloth, suede leather and fabric backed polyurethane upper materials and also resin-rubber shoe soling material primed with a commercial polychloroprene primer.

When 1 by 6 inch test strips of roughed polyvinyl chloride coated fabric were coated with molten polymeric material at a temperature of 205° C. and joined to resin-rubber outsole material test strips which had been primed with polychloroprene primer and coated with molten polymeric material, excellent bonds were obtained. Test pieces which had been coated with the molten polymeric material were allowed to stand at room temperature for 2 minutes after being coated and then assembled in a joint under a pressure of 286 p.s.i. for 15 seconds. Peel pull strength results after 30 seconds showed a value of 22 pounds. Joints aged 21 days developed a peel pull strength of 66 pounds.

Similar assemblies were made in which the hot melt coated test strips were held for 15 minutes at room temperature before being joined under pressure. Peel strength after 30 seconds was 34 pounds. Joints aged for 21 days failed by strip delamination at 72 and 81 pounds.

Test strips prepared with the hot melt coatings as described above were pressed together with finger pressure after standing at room temperature for 5 minutes. A peel pull test conducted 30 seconds after hand pressing showed a peel strength of 22 to 28 pounds.

A similar joint made by a hand pressing 2 by 1 inch coated areas of the test strips were loaded in shear 30 seconds after assembly. A force of 80 pounds developed before the shoe sole material strips failed within itself. The joined areas remained intact.

EXAMPLE 3

A copolyester was prepared as in Example 1 and 1,058 grams (approximately four gram moles) were condensed under vacuum at 250° C. to molecular weight of about 10,000. A water cooled reflux condenser was fitted to the reactor after releasing the vacuum and there were then added 52.4 grams of 1,6 hexamethylene diammonium adipate. A clear solution was formed and there was then added 33.1 grams of a 70% solids water solution of 1,6 hexamethylene diamine. The mixture was stirred for 20 minutes while the temperature dropped from 177° to 155° C. At this time the reflux condenser was removed and vacuum applied. The temperature was raised to 250° C. and maintained at that value until the viscosity of the polymer material had reached about 1,000 poises. The polymer was then poured into aluminum trays to solidify.

Tempered windshield plate glass was precoated with a silane adhesion promoter and enameled steel frame member surfaces were precoated with a pigmented polychloroprene based primer.

The resulting copolymer was remelted and brought to a temperature of about 400° F. and thereafter applied as a ⅜ inch layer on the face of the glass which was at room temperature. Two minutes after deposition of the molten material, the primed surface of the steel frame member was pressed with a force of 5 p.s.i. against the deposit of copolymer material on the glass. The copolymer material was deformed to a layer 0.1 inch thick. After aging overnight at room temperature, the adhesive joined assembly was tested and found to be very tough and impact resistant when cooled to minus 20° F. and held at this temperature for 30 days. The joint between the glass and the steel showed a shear strength of from 320 to 360 p.s.i. at room temperature and 43 p.s.i. at 160° F. After eight days at 104° – 107° F. and 100% relative humidity, the bonds failed in shear at 106 p.s.i. while wet at 104° F. and at 160 p.s.i. while wet after cooling to room temperature. After air drying at room temperature for 6 hours, the shear strength was 285 p.s.i.

EXAMPLE 4

A copolyester was prepared following the procedure of Example One but using a reaction mix comprising in percent by weight of dibasic acids, 20.22% of terephthalic acid, 25.72% isophthalic acid, 51.73% of dimer acid and 2.33% of trimer acid with an excess of 1,4 butanediol.

One thousand grams of the low molecular weight polymer formed was condensed under vacuum at 480° F. to an estimated molecular weight of about 10,000, 37.2 grams of 66 hexamethylene diammonium adipate salt was added and then there was added 23.6 grams of 70% aqueous solution of 16 hexamethylene diamine and stirring was continued at about 350° F. At the end of 35 minutes, temperature was brought to 400° F. and vacuum was reapplied. The temperature was raised to 480° F. and was maintained at this value until the viscosity of the polymeric material had reached about 1500 poises. The product was poured out and solidified in aluminum trays. The product flows well at 480° F. but gelled mildly on rapid cooling. The cooled product is opaque.

Having thus described my invention and what I claim as new and desire to secure as Letters Patent is:

1. A heat fusible heterophase copolyester-amide resin formed of copolyester soft segments chemically joined to hydrogen bonding copolyamide hard segments having limited compatibility with the copolyester soft segments in which said copolyester segments comprise from about 30 to about 60% of aliphatic ester components and from about 70 to about 40% of aromatic ester components, said copolyester segments have a molecular weight of from about 5,000 to about 15,000, and in which the total amide structure in said copolyesteramide constitutes by weight from about 5 to about 40% based on the weight of said copolyester-amide and amide structure from aminolysis of said copolyester constitutes from about 40 to about 70% by weight of said total amide structure.

2. A linear copolyester-amide resin as defined in claim 1 in which the aromatic components of said copolyester segments are condensation products of a glycol with terephthalic and isophthalic acids in relative proportions by weight of from about 3.5 parts of terephthalic acid to 6 parts of isophthalic acid to about 6 parts of terephthalic acid to 4 parts of isophthalic acid.

3. A linear copolyester-amide resin as defined in claim 2 in which said aliphatic component for condensation with said aromatic component of said copolyester is the product of condensing and polymerizing at least one saturated aliphatic dibasic acid having from 6 to 36 carbon atoms with a glycol having from 2 to 6 carbon atoms or the polyester from condensation and polymerization of a polylactone polyol having a molecular weight of from about 500 to about 1,500 or mixtures of said aliphatic polyester components, substantial portions of said copolyester structure being unsubstituted by amide structure to provide soft domains effective to provide retained tackiness in the copolyester-amide.

4. A linear copolyester-amide resin as defined in claim 3 in which said copolyamide segments comprises amide condensates of at least one aliphatic or aromatic dibasic acid and at least one aliphatic diamine, and amide structure from aminolysis of said copolyester by an aliphatic diamine.

5. A linear copolyester-amide resin as defined in claim 4 in which said dibasic acid condensed to form amide is at least one saturated aliphatic dibasic acid having a carbon chain of from 2 to 12 carbon atoms or at least one aromatic dibasic acid or mixtures of these, in which said diamine for condensation to form amide has from 2 to 12 carbon atoms and in which the aliphatic diamine for forming amide structure by aminolysis of said copolyester has a carbon chain of from 2 to 12 carbon atoms.

6. A linear copolyester-amide resin as defined in claim 5 in which said terephthalic and isophthalic acids of said copolyester are present in relative proportions by weight of from about 3 to about 4, in which the amide structure from aminolysis of said copolyester constitutes from about 40 to about 50% by weight of the total amide in said copolyester-amide and in which the total amide structure constitutes from about 7.5 to about 30% by weight based on the weight of said copolyester-amide, said copolyester-amide having a melt viscosity of from about 500 to about 2,000 poises at 480° F. and having a Shore A hardness at room temperature of from about 60 to about 95.

7. An adhesive process in which a copolyester-amide resin as defined in claim 1 is melted and deposited in molten condition on a surface to be bonded, the deposited adhesive is cooled below the crystallization temperature of the polyamide segments, a further surface is pressed against the deposited copolyester-amide during the period within which the polyester segments remain mobile so that the deposited copolyester-amide retains tack to establish a bond to said further surface, and the copolyester-amide is hardened to tack-free strong condition bonding said surfaces firmly together.

8. An adhesive process in which a copolyester-amide resin as defined in claim 7 is melted and deposited in molten condition on a surface to be bonded, the deposited adhesive is cooled below the crystallization temperature of the polyamide segments, a further surface is pressed against the deposited copolyester-amide during the period within which the polyester segments remain mobile so that the deposited copolyester-amide retains tack to establish a bond to said further surface, and the copolyester-amide is hardened to tack-free strong condition bonding said surfaces firmly together.

9. The process for adhesive bonding shoe parts comprising the steps of melting a copolyester-amide resin as defined in claim 6 depositing the molten resin on the attaching surfaces of a shoe part to be bonded, cooling the deposited adhesive below the crystallization temperature of the polyamide segments, pressing the attaching surface of a second shoe part to be bonded against the deposited copolyester-amide during the period within which the polyester segments remain mobile so that the deposited copolyester-amide retains tack to establish a bond between said attaching surfaces and allowing the copolyester-amide to harden to tack-free strong condition bonding said shoe parts together.

* * * * *

PO-1050
(5/69)

UNITED STATES PATENT OFFICE
CERTIFICATE OF CORRECTION

Patent No. 4,004,960          Dated Jan. 25, 1977

Inventor(s) Ernest M. Crowell

It is certified that error appears in the above-identified patent and that said Letters Patent are hereby corrected as shown below:

Column 8, Cl. 1, Line 18, after the numeral "30" insert --%--

Column 8, Cl. 1, Line 19, after the numeral "70" insert --%--

Column 8, Cl. 1, Line 23, after the numeral "5" insert --%--

Column 8, Cl. L, Line 26, after the numeral "40" insert --%--

Signed and Sealed this

Fifth Day of April 1977

[SEAL]

Attest:

RUTH C. MASON
*Attesting Officer*

C. MARSHALL DANN
*Commissioner of Patents and Trademarks*